United States Patent
Klingels et al.

(10) Patent No.: US 9,771,896 B2
(45) Date of Patent: Sep. 26, 2017

(54) MIXING DEVICE AND TURBOFAN ENGINE HAVING SUCH MIXING DEVICE

(71) Applicant: MTU Aero Engines AG, Munich (DE)

(72) Inventors: Hermann Klingels, Dachau (DE); Stephan Klaen, Munich (DE); Christian Scherer, Roehrmoos (DE); Uwe Vogel, Munich (DE)

(73) Assignee: MTU AERO ENGINES AG, Munich (DE)

(*) Notice: Subject to any disclaimer, the term of this patent is extended or adjusted under 35 U.S.C. 154(b) by 350 days.

(21) Appl. No.: 14/244,050

(22) Filed: Apr. 3, 2014

(65) Prior Publication Data

US 2014/0298772 A1     Oct. 9, 2014

(30) Foreign Application Priority Data

Apr. 4, 2013   (DE) .................. 10 2013 205 911

(51) Int. Cl.
| | |
|---|---|
| *F02K 3/075* | (2006.01) |
| *F02K 1/38* | (2006.01) |
| *F02K 1/48* | (2006.01) |
| *F02K 1/46* | (2006.01) |
| *F02K 1/06* | (2006.01) |

(52) U.S. Cl.
CPC ............. *F02K 3/075* (2013.01); *F02K 1/386* (2013.01); *F02K 1/06* (2013.01); *F02K 1/46* (2013.01); *F02K 1/48* (2013.01); *F05D 2250/61* (2013.01)

(58) Field of Classification Search
CPC ..... F02K 1/48; F02K 1/06; F02K 1/15; F02K 1/386; F02K 1/46; F02K 1/1207; F02K 1/1223
See application file for complete search history.

(56) References Cited

U.S. PATENT DOCUMENTS

2005/0126174 A1   6/2005   Lair

FOREIGN PATENT DOCUMENTS

| DE | 10 2010 014 909 A1 | 10/2011 | | |
| DE | 10 2010 014 910 A1 | 10/2011 | | |
| ES | CA 2308131 A1 * | 11/2000 | ............. | F02K 1/008 |
| GB | 1002116 A | 8/1965 | | |
| WO | WO 9418446 A2 * | 8/1994 | ............... | F02K 1/06 |

\* cited by examiner

*Primary Examiner* — William H Rodriguez
*Assistant Examiner* — Thomas Burke
(74) *Attorney, Agent, or Firm* — Barlow, Josephs & Holmes, Ltd.

(57) ABSTRACT

The invention relates to a mixing device and a turbofan engine having such a mixing device 30 for mixing a first gas flow 40 with a second gas flow 50 in a turbofan engine 20, having an actuating device 95 and walls 60, which bound a channel 65 for the first gas flow 40 and a channel 70 lying radially outside for the second gas flow 50, the actuating device 95 comprising a coupling element 110 that is coupled to the walls (60), the actuating device 95 being designed to pivot the walls 60 between a first position and a second position disposed radially outside relative to the first position, the actuating device 95 comprising an adjusting ring 105 that can be rotated between a first rotating position and a second rotating position in the peripheral direction and that is joined to the coupling element 110.

9 Claims, 4 Drawing Sheets

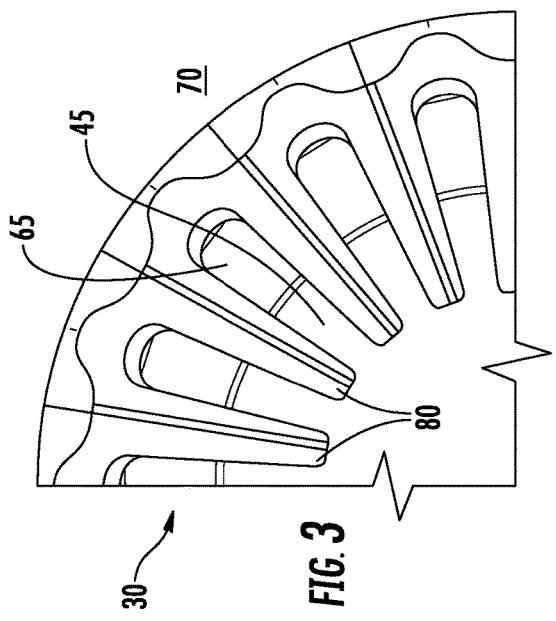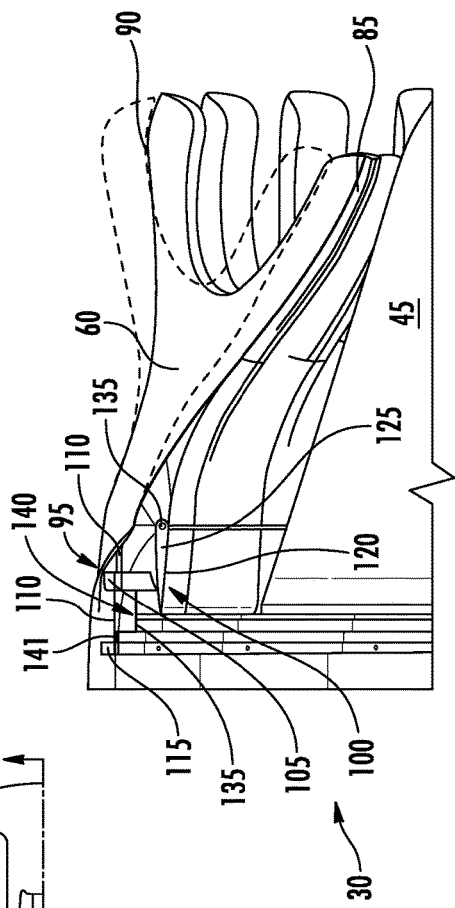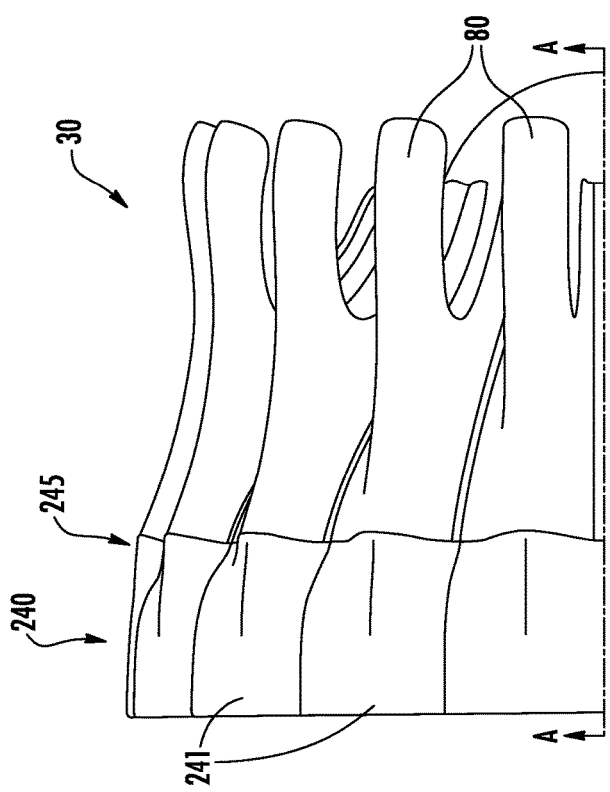

MIXING DEVICE AND TURBOFAN ENGINE HAVING SUCH MIXING DEVICE

BACKGROUND OF THE INVENTION

The invention relates to a mixing device for mixing a first gas flow with a second gas flow in a turbofan engine, having an actuating device and walls that bound a radially inner-lying channel for the first gas flow and a radially outer-lying channel for the second gas flow, the actuating device comprising a coupling element that is coupled to the walls, the actuating device being designed to pivot the walls from a first position to a second position disposed radially outside relative to the first position by means of the coupling element.

In turbofan engines, a noise reduction and a reduction of specific fuel consumption can be achieved by mixing a mantle flow of a fan and a core flow of an aircraft gas turbine. Conventionally, mixing takes place via a mixing device having a meandering profile that is positioned downstream behind a low-pressure turbine of the aircraft gas turbine, this mixing device alternately deflecting at least one partial flow of the mantle flow radially inward and at least one partial flow of the core flow radially outward. Such mixing devices, called bloom mixers, based on their meandering profile, are shown, for example, in DE 10 2010 014 909 A1 or DE 10 2010 014 910 A1. In order to be able to adapt the mixing device to different operating points, the profile of the mixing device is varied. The direction of deflection of the core flow or of the mantle flow can be varied here by means of a flexible wall structure that is widened or constricted by an actuating device. The direction of deflection, however, is limited in these mixing devices by the elasticity of the material.

BRIEF SUMMARY OF THE INVENTION

It is the object of the invention to provide an improved mixing device for a turbofan engine and a turbofan engine having such a mixing device.

This object is solved by means of a mixing device with the features of claim 1. Advantageous embodiments are indicated in the dependent claims.

According to the invention, it was recognized that an improved mixing device for mixing a first gas flow with a second gas flow in a turbofan engine can be provided in that the mixing device comprises an actuating device and walls that bound a radially inner-lying channel for the first gas flow and a radially outer-lying channel for the second gas flow. The actuating device comprises a coupling element that is coupled with the walls, the actuating device being designed to pivot the walls between a first position to a second position disposed radially outside the first position by means of the coupling element. Further, the actuating device comprises an adjusting ring that can be rotated between a first rotating position and a second rotating position in the peripheral direction and that is joined to the coupling element. In this case, the coupling element is designed rigid and is coupled with the adjusting ring in such a way that, by rotating the adjusting ring between the first rotating position and the second rotating position, the walls are pivoted by the coupling element between the first position and the second position corresponding to the rotation of the adjusting ring.

In this way, the first position and the second position can be radially distanced selectively far from one another, but at the same time a compact and robust design of the actuating device for pivoting the walls can be provided. Compactness is expressed here in that a particularly small radial structural space is required for this.

In another embodiment, a support structure is provided that is disposed adjacent to the walls in the axial direction, the support structure comprising a fastening element, wherein the adjusting ring is disposed axially between the fastening element and the walls, and is joined to the fastening element with another coupling element. In this way, an axial position of the adjusting ring can be established in a simple way.

It is particularly advantageous if the coupling element comprises a coupling rod and there is provided at least one articulation with a first articulation section and a second articulation section joined to the first articulation section, wherein the first articulation section can be pivoted opposite the second articulation section around at least one axis, particularly around two axes, the first articulation section being disposed on at least one longitudinal end of the coupling rod, and the second articulation section being coupled to the fastening element or the adjusting ring or the walls.

In another embodiment, the coupling element and the additional coupling element are formed identically. A cost-effective mixing device can be provided in this way.

Alternatively, it is conceivable that in another embodiment, the coupling element has a lengthwise extension that is different from the lengthwise extension of the additional coupling element.

It is particularly advantageous if the walls comprise a first wall segment and a second wall segment disposed lying radially outside the first wall segment, the coupling element being joined to the first wall segment and the second wall segment being coupled to the first wall segment.

The first wall segment can be pivoted in a simple way if another articulation is disposed on the support structure, this articulation connecting the first wall segment to the support structure so that the first wall segment is pivotable around a pivoting axis, the pivoting axis being disposed perpendicular to an axis of rotation of the adjusting ring.

It is particularly favorable in terms of structural space if an articulation piece is disposed on the outside on the first wall segment, the coupling element being fastened to the articulation piece radially on the outside on the articulation piece at a distance to the pivoting axis.

The object will also be achieved, however, by a turbofan engine having the features of the present invention.

It was recognized according to the invention that a particularly low-polluting and low-noise turbofan engine can be provided if the turbofan engine comprises a fan, an aircraft gas turbine coupled to the fan, and a mixing device, the aircraft gas turbine providing a first gas flow and the fan providing a second gas flow flowing radially outside relative to the first gas flow. The mixing device is disposed on the downstream side of the aircraft gas turbine and is designed to mix the first gas flow with the second gas flow, at least partially, the mixing device being designed as explained above.

BRIEF DESCRIPTION OF THE DRAWING FIGURES

The invention will be explained in more detail below based on the figures. Here, the same components are designated by the same reference numbers. Herein:

FIG. 2 shows a lateral view of the mixing device shown in FIG. 1;

FIG. 3 shows a back view of the mixing device shown in FIG. 2;

FIG. 4 shows a longitudinal section through the mixing device shown in FIG. 2 along a sectional plane A-A shown in FIG. 2;

DETAILED DESCRIPTION OF THE INVENTION

Figure 1:
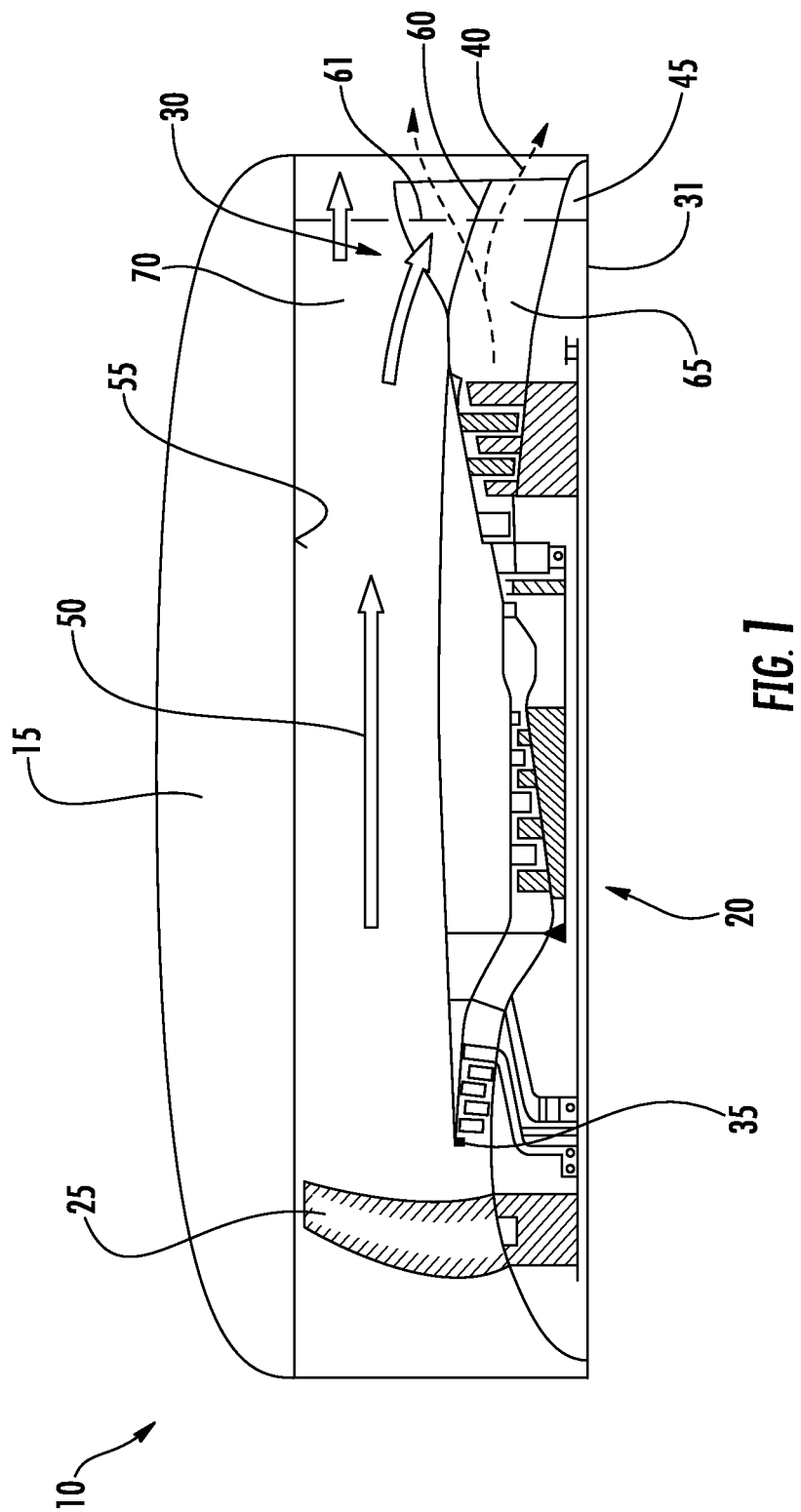
FIG. 1 shows a schematic sectional view through a turbofan engine having a mixing device.

FIG. 1 shows a schematic sectional view through a turbofan engine 10 having a mixing device 30.

The turbofan engine 10 is disposed in an engine nacelle 15 and comprises an aircraft gas turbine 20, a fan 25, which is arranged on the upstream side relative to the aircraft gas turbine 20, as well as the mixing device 30 arranged on the downstream side relative to the aircraft gas turbine 20. Further, elements of the aircraft gas turbine 20 and of fan 25 are disposed rotatable around an axis of rotation 31 of the turbofan engine 10. During operation of the turbofan engine 10, an air flow that is produced is divided at a flow splitter 35. A portion of the air flow that flows radially inside, also called the core or primary flow, is guided through the aircraft gas turbine 20 and leaves the aircraft gas turbine 20 on the downstream side as hot-air flow 40 (dashed line) between an exhaust gas cone 45 and the mixing device 30. A flow of cold gas 50 (solid line) running radially outside relative to the aircraft gas turbine 20 via the flow splitter 35, also called the mantle, bypass, or secondary flow, is guided between an inner wall 55 of the engine nacelle 15 and the mixing device 30. The mixing device 30 is designed to mix the cold-air flow 50 with the hot-air flow 40 in a mixing plane 61 in order to reduce the fuel consumption of the aircraft gas turbine 20 and the noise emissions of the turbofan engine 10.

Figure 5:
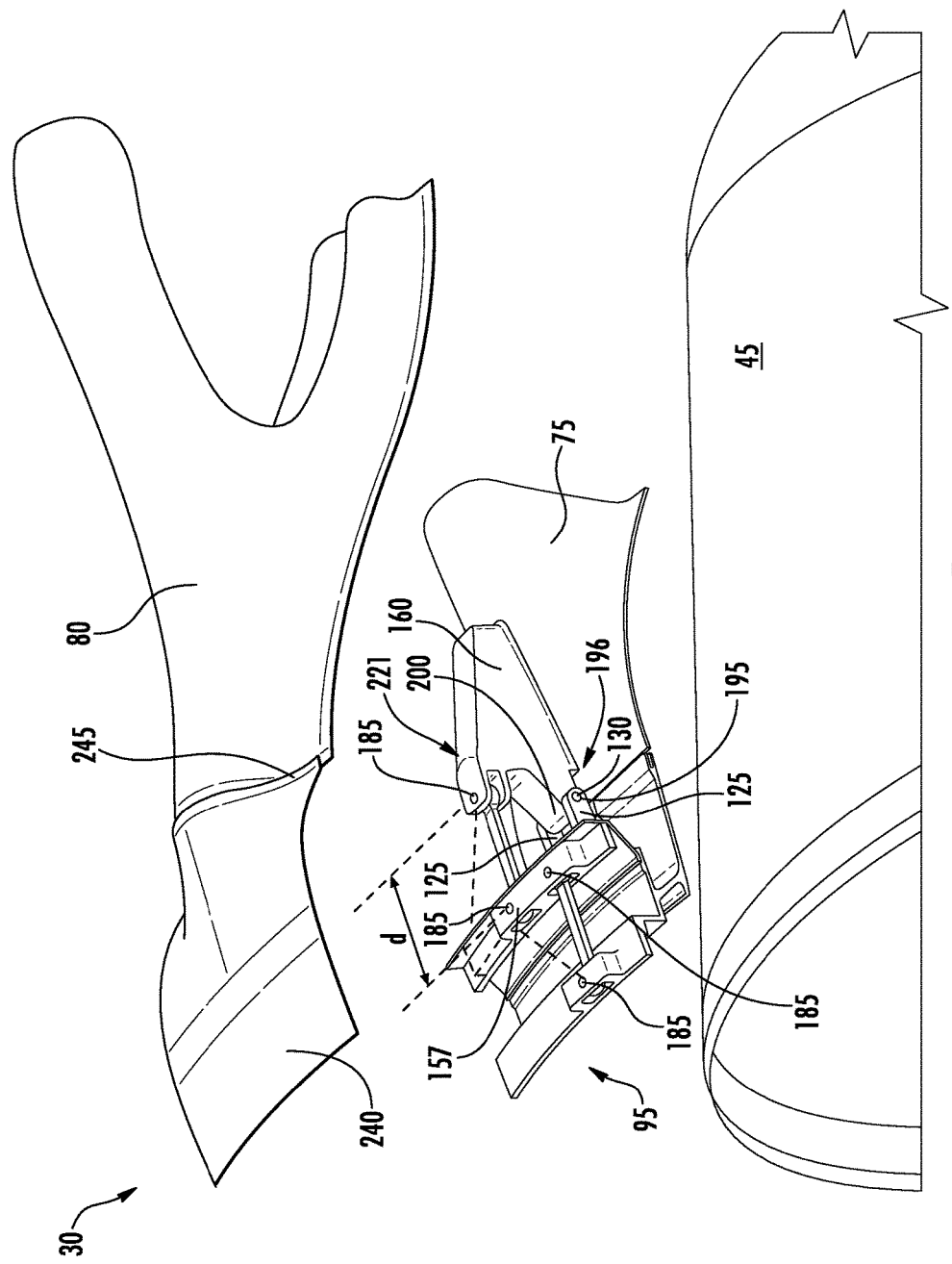
FIG. 5 shows an exploded drawing of the mixing device, which is shown in FIG. 4, having an actuating device.
Figure 6:
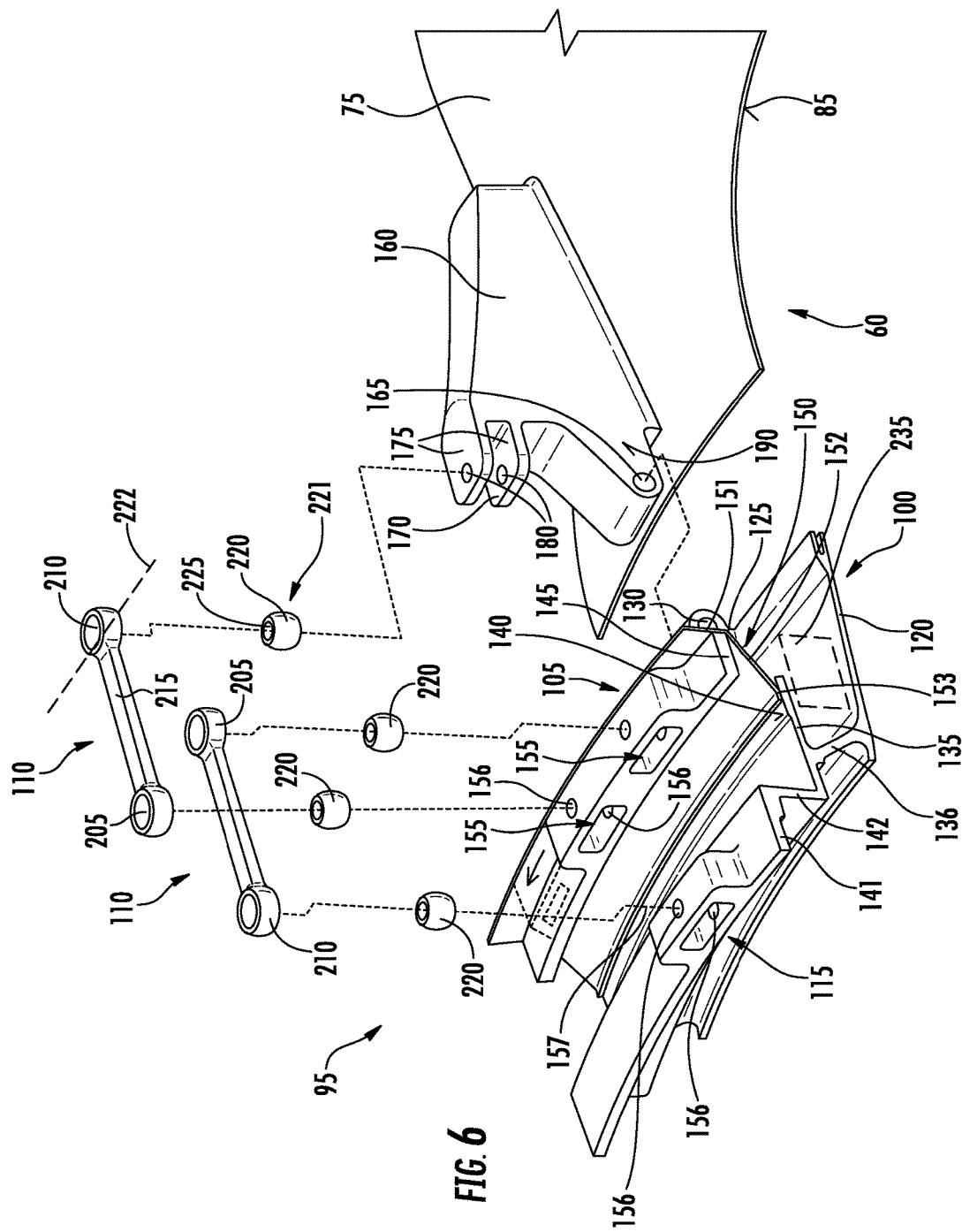
FIG. 6 shows an exploded drawing of the actuating device shown in FIG. 5.

FIG. 2 shows a lateral view of the mixing device 30 shown in FIG. 1, and FIG. 3 shows a back view of the mixing device 30 shown in FIG. 2. FIG. 4 shows a longitudinal section through the mixing device 30 shown in FIG. 2 along a sectional plane A-A shown in FIG. 2, and FIG. 5 shows an exploded drawing of the mixing device 30 shown in FIG. 4 having an actuating device 95. FIG. 6 shows an exploded drawing of the actuating device 95 shown in FIG. 5. FIGS. 1 to 6 will be explained jointly below for facilitated comprehension.

The mixing device 30 comprises walls 60 that are designed to bound the hot-air flow 40 flowing radially inside in a first channel 65 between the exhaust gas cone 45 and the walls 60. Further, the walls 60 bound a second channel 70 that is radially outside and that runs between the inner wall 55 and the walls 60. The cold-air flow 50 coming from the fan 25 is guided in the second channel 70. The mixing device 30 is designed here to mix the hot-air flow 40 together with the cold-air flow 50 in order to reduce the fuel consumption of the turbofan engine 10. For this purpose, the mixing device 30 is designed as a bloom mixer, the walls 60 comprising a plurality of wall segments 75, 80 disposed next to one another in the peripheral direction. Lying radially outside on a first wall segment 75, there is provided in each case a second wall segment 80, which is coupled to the first wall segment 75. Here, the second wall segment 80 comprises a first guide profile 85 running radially inside and a second guide profile 90 running radially outside relative to the first guide profile 85. A radially inward flow of both the cold-air flow 50 and of the hot-air flow 40 is achieved with the first guide profile 85. A radially outward flow of the cold-air flow 50 and of the hot-air flow 40 is achieved with the second guide profile 90. In this way, alternatively, the hot-air and cold-air flows 40, 50 are guided in the peripheral direction and are reliably mixed by a cross-flow component in the cold-air and hot-air flows 40, 50 in the peripheral direction.

In order to make possible an optimal noise reduction for different operating points of the aircraft gas turbine 20, an actuating device 95 is provided. The actuating device 95 is coupled to the walls 60. Depending on the operating point, the actuating device 95 pivots the walls 60 between a first position (shown by means of the solid line in FIG. 4), which is arranged radially inside, for example, and a second position (shown by means of the dashed line in FIG. 4), which is arranged radially outside, for example. This brings about the circumstance that in the first position, the cold-air flow 50 is guided more strongly inward than in the second position of the walls 60, for which the cold-air flow 50 can flow further outward radially than in the first position of the walls 60. The two positions can be selected dependent on the respective load or operating state of the aircraft gas turbine 20. Of course, it is also conceivable, depending on the operating point, to provide positions of the walls between the two positions by the actuating device 95.

The actuating device 95 is disposed radially on the outside on a support structure 100. The support structure 100 is disposed on the downstream side on the aircraft gas turbine 20 and is connected to a torsionally rigid structure (not shown) of the aircraft gas turbine 20. The actuating device 95 comprises an adjusting ring 105 and a plurality of coupling elements 110 distributed in the peripheral direction. The coupling elements 110 are designed rigid. Also on the support structure 100 are disposed fastening elements 115 distributed at uniform distances radially on the outside in the peripheral direction, on the support structure 100. The support structure 100 comprises a stepped configuration running radially outward on the upstream side. Here (see FIG. 6), in a first section 120 lying radially inside, a piece 125 is provided, and a first articulation opening 130 is arranged on the end of this piece facing the wall 60. A second section 135 is disposed radially outside relative to the first section 120. The first section 120 and the second section 135 are joined by means of a first connection piece 136. The first connection piece 136 here is aligned obliquely to the axis of rotation 31 and prevents a penetration of the hot-air flow 40 between the first and the second sections 120, 135 of the support structure 100. The second section 135 is disposed essentially parallel to the axis of rotation 31 of the aircraft gas turbine 20. Radially, on the outer side, the second section 135 comprises a guide surface 140. The guide surface 140 here is offset radially outward relative to the rest of second section 135. Of course, it is also conceivable that the guide surface 140 is formed running continuously at second section 135 or is offset radially inward. In another, third section 141 disposed radially on the outside relative to the second section 135, the fastening elements 115 are disposed radially on the outside on the third section 141. The third section 141 and the second section 135 are joined via a second connection piece 142 running on the peripheral side. Also, the second connection piece 142 is disposed perpendicular to the axis of rotation 31 and prevents a penetration of the hot-air flow 40 between the second and the third sections 135, 141, and thus prevents an overheating of the components of the actuating device 95 that are disposed on the downstream side relative to the support structure 100.

The adjusting ring 105 comprises a ring element 145 and a guide element 150 which is disposed radially inside and on the side of the adjusting ring 145 facing the wall 60. The guide element 150 comprises a first guide element section 151 disposed perpendicular to the axis of rotation 31 and a cone-shaped second guide element section 152 disposed lying radially inside relative to the first guide element section 151. The guide element 150 is joined to the ring element 145 via the first guide element section 151. A V-shaped bearing section 153 that lies on the guide surface and fixes or supports the adjusting ring 145 in its position radially is provided on the second guide element section 152 radially inside relative to the adjusting ring 145 on the side facing the guide surface 140. Of course, it is also conceivable to support the ring element 145 in another way.

The ring element 145 comprises a plurality of first rectangular-shaped uptakes 155, which are disposed at uniform distances peripherally next to one another in pairs. A coupling element 110 disposed on the upstream side and a coupling element 110 disposed downstream to the ring element 145 engage in each of the first uptakes 155. The coupling element 110 on the upstream side is joined via the first uptake 155 with the ring element 145 at a first longitudinal end of the coupling element 110 and is joined to the fastening element 115 at a second longitudinal end of the coupling element 110. Each of the first uptakes 155 comprises two opposite-lying first articulation bolt uptakes 156, which are disposed on an axis 157 perpendicular to the axis of rotation 31. Of course, it is also conceivable that the first uptakes 155 are distributed irregularly, individually and/or grouped, along the periphery of the ring element 145. It is also conceivable that the first uptakes 155 are designed in another way, for example, with respect to their cross section. The fastening element 115 of the support structure 100 is designed here identical to the first uptake 155 and the fastening elements are distributed peripherally along the support structure 100 corresponding to the first uptakes 155.

On the first wall segment 75, the walls 60 comprise an articulation piece 160 which extends in the radial direction substantially parallel to the axis of rotation 31 and which is disposed radially outside on the first wall segment 75. The articulation piece 160 comprises an articulation borehole 165, which is disposed on the upstream side, lying radially outside relative to the first guide profile 85 and adjacent to it on the articulation piece 160. Lying radially outside relative to the articulation borehole 165 is disposed a coupling uptake 170, which comprises two tab elements 175 designed to extend in parallel. A second articulation bolt uptake 180 is provided in each of the tab elements 175 so as to receive a first articulation bolt 185 running radially in the direction of the axis of rotation 31 (see FIG. 5).

The pieces 125 are disposed in parallel on the first section 120 of the support structure 110 and laterally engage the articulation piece 160 at the articulation borehole 165 and are applied at a lateral surface 190 of the articulation piece 160 facing it each time, in the region of the articulation borehole 165. Further, a second articulation bolt 195 is guided through the first articulation opening 130 and the articulation borehole 165, in order to provide an articulation 196 for pivoting the first wall segment 75 around a pivoting axis 200, which is aligned perpendicular to the axis of rotation 31 of the aircraft gas turbine 20.

The coupling element 110 comprises a second uptake 205 on a first longitudinal end and a third uptake 210 on a second longitudinal end. The second and third uptakes 205, 210 are thus designed in spherical shell shape on the inside. Between the two uptakes 205, 210 there is disposed a coupling rod 215, which is designed as straight and connects the second uptake 205 with the third uptake 210. The two uptakes 205, 210 peripherally engage an articulation head 220, which is adapted in its outer-side configuration to the spherical-shell configuration of the second uptake 205 and the third uptake 210. The articulation head 220 is engaged peripherally by the uptakes 205, 210, the articulation head 220 being in contact with the second or third uptake 205, 210 associated with it in order to be fixed in its position by the respective uptake 205, 210. Here, the articulation head 220 and the uptakes 205, 210 each form an articulation 221, the second and third uptakes 205, 210 each representing a first articulation section, which can be tilted opposite the articulation head 220 as the second articulation section in at least two planes or around the axis 157 and another pivoting axis 222, which is aligned perpendicular to the axis 157. In order to avoid an unwanted slipping out of the articulation head 220 from the second or third uptake 205, 210, for example, the articulation head 220 can be pressed into the second or third uptake 205, 210. In the embodiment here, the articulation 221 is designed as a ball-and-socket joint, but, of course, other articulation configurations would also be conceivable, as long as it is possible to pivot the coupling rod 215 opposite the ring element 145 in two planes.

The articulation head 220 comprises a third articulation bolt uptake 225. For joining the coupling element 110 disposed downstream relative to the ring element 145, the first articulation bolt 185 is guided through the third articulation bolt uptake 225 when the mixing device 30 is in the mounted state; this bolt 185 is guided further through the first articulation bolt uptake 156 of the first uptake 155 of the ring element 145, and thus joins the coupling element 110 to the ring element 145 at the second uptake 205.

Further, another first articulation bolt 185 that connects the coupling element 110 to the articulation piece 160 is guided through the third uptake 210 and its second articulation bolt uptake 180 of the coupling element 110 and the coupling uptake 170 and its second articulation bolt uptake 180. In this way, the ring element 145 can be coupled in a simple way to the articulation piece 160.

The coupling element 110 disposed on the left side in FIGS. 5 and 6 or on the upstream side, i.e., the side of the ring element 145 facing away from the walls 60, is joined to the first uptake 155 of the ring element 145 and to the fastening element 115 by means of the first articulation bolt 185. Further, its axial position is fixed relative to the support structure 100 through the fastening of the adjusting ring 105 to the coupling elements 110 both at the fastening element 115 as well as at the coupling uptake 170.

Both the second and the third uptakes 205, 210 are designed identically to one another in the embodiment. Of course, it is also conceivable that the second and third uptakes 205, 210 or the articulation head 220 associated with the second and third uptakes 205, 210 are formed differently from one another. Further, the two coupling rods 215 are identical in their lengthwise extension in the embodiment. Of course, a configuration is also conceivable to the effect that the coupling element 110 disposed on the left in FIGS. 5 and 6 has a coupling rod 215, the lengthwise extension of which differs from the coupling element 110 and its coupling rod 215 disposed on the right in FIGS. 5 and 6.

The adjusting ring 105 is coupled to an actuator 235 shown schematically in FIG. 6. In turn, the actuator 235 can be connected here to a control device (not shown), which is designed to control the actuator 235 and/or supply it with energy. The actuator 235 is designed to rotate the adjusting ring 105 between a first rotating position (shown in FIG. 6 by means of solid lines) and a second rotating position (shown in FIG. 6 by means of dashed lines) around the axis of rotation 31 of the aircraft gas turbine 20. The actuator 235 can be designed, for example, as a mechanical, electrical, electromechanical, pneumatic and/or hydraulic actuator 235. Of course, other operating modes or combinations of named embodiments of the actuator 235 are also conceivable. It is also conceivable to arrange the actuator 235 at a position that is radially outside relative to the first section 120 of the support structure 110.

If the adjusting ring 105 is rotated counterclockwise to the left, for example, from a first rotating position, then the coupling elements 110 are entrained by the ring element 145. A deflection of the coupling element 110 in the second rotating position upon a rotation of the adjustment ring 105 is shown schematically in FIG. 5 by means of the dashed lines. Due to the torsionally rigid arrangement of the fastening elements 115 and the articulation pieces 160, an axial distance d between the articulation piece 160 and the adjusting ring 105 is shortened when the adjusting ring 105 is rotated from the first rotating position to the second rotation position, so that the first wall segment 75 is lifted or is entrained from its first position to its second position, which correlates with the second rotating position. During the rotating, the first wall segment 75 pivots radially outward around the articulation axis 200. Due to the coupling of the first wall segment 75 with the second wall segment 80, the latter is also pivoted radially outward around the articulation axis 200. The first channel 65 between the walls 60 and the exhaust gas cone 45 is widened thereby. If the adjusting ring 105 is rotated back from the second rotating position in the direction of the first rotating position or the original position, then the distance d between the adjusting ring 105 and the coupling uptake 170 is increased, so that the first wall segment 75 is pivoted around the pivoting axis 200 back in the direction of the first position. It is pointed out that a rotation clockwise or counterclockwise leads to the same pivoting result. Of course, it is also conceivable that intermediate rotating positions can be provided between the first rotating position and the second rotating position or the first position of the wall segment 75 and the second position of the walls 60, so that a continuous adjustment of the walls 60 and thus a continuous adjustment of a cross section of the first channel 65 or of the second channel 70 can be established in a mixing plane 61. In this way, the turbofan engine 10 or the mixing device 30 can be fine-tuned to different operating points of the turbofan engine 10, so that the turbofan engine 10 overall has a smaller noise emission and smaller pollutant emissions.

In order to avoid the penetration of the cold-air flow 50 into the mixing device 30 or a mixing of the hot-air flow 40 with the cold-air flow 50 at the actuating device 95, the support structure 100 and its individual sections 120, 135, 141 are joined together into one unit. Further, the individual sections 120, 135, 141 are disposed in stepped manner relative to one another, so that the actuating device 95 is disposed completely downstream behind the support structure 100 and thus lies in the "dead-water" zone of the support structure 100. Additionally, it is further conceivable that a sealing element (not shown) is provided on the support structure 100 in order to seal the support structure 100 radially outward relative to a panel 240. The panel 240 is formed in individual panel segments 241 and has an overlapping section 245, by which the panel 240 overlaps the second wall segment 80, so that a penetration of the cold-air flow 50 into the mixing device 30 is avoided. Here, the overlapping section 245 is designed such that the panel 240 is applied radially outside on the second wall segment 80 at any provided position of the second wall segment 80. In this way, a mixing of hot-air flow 40 and cold-air flow 50 inside the mixing device 30, particularly inside the actuating device 95, is further reliably avoided.

The invention claimed is:

1. A mixing device for mixing a first gas flow with a second gas flow in a turbofan engine, comprising:
   an actuating device and walls that bound a radially inner-lying channel for the first gas flow and a radially outer-lying channel for the second gas flow,
   the actuating device comprising a first coupling element, having a first end and a second end; the first end of the first coupling element being coupled to the walls,
   the actuating device being configured and arranged to pivot the walls between a first position and a second position disposed radially outside relative to the first position, by the first coupling element, wherein
   the actuating device comprises an adjusting ring that rotates between a first rotating position and a second rotating position in a peripheral direction and that is joined to the first coupling element,
   the first coupling element being configured and arranged as rigid and being coupled to the adjusting ring via the second end of the first coupling element whereby rotating the adjusting ring between the first rotating position and the second rotating position, the walls are pivoted by the first coupling element between the first position and the second position corresponding to the rotation of the adjusting ring;
   a support structure, which is disposed bounding the walls in an axial direction, the support structure comprising a fastening element, where axially, the adjusting ring is disposed between the fastening element and the walls; and
   a second coupling element having a first end and a second end; the first end of the second coupling element being coupled to the fastening element of the support structure and the second end of the second coupling element being coupled to the adjusting ring wherein the first end of the second coupling element and the first end of the first coupling element are axially on opposing sides of and axially spaced apart from the adjusting ring.

2. The mixing device according to claim 1, wherein the second end of the first coupling element and the second end of the second coupling element are coupled to the adjusting ring next to one another in the peripheral direction.

3. The mixing device according to claim 1, wherein the first coupling element comprises a coupling rod and there is provided at least one articulation having a first articulation section and a second articulation section connected to the first articulation section, the first articulation section being pivotable opposite the second articulation section around at least one axis, the first articulation section being disposed on at least one longitudinal end of the coupling rod, and the second articulation section being coupled to the fastening element or to the adjusting ring or to the walls.

4. The mixing device according to claim 2, wherein the first coupling element and the second coupling element are configured identically.

5. The mixing device according to claim 2, wherein the first coupling element has a lengthwise extension that is different from a lengthwise extension of the second coupling element.

6. The mixing device according to claim 1, wherein the walls comprise a first wall segment and a second wall segment disposed lying radially outside relative to the first wall segment, the first coupling element being joined to the first wall segment and the second wall segment being coupled to the first wall segment.

7. The mixing device according to claim 6, wherein an articulation, which joins the first wall segment so as to be pivotable around a pivoting axis, is disposed on the support structure, the pivoting axis of the articulation being disposed perpendicular to an axis of rotation of the adjusting ring.

8. The mixing device according to claim 7, wherein on the first wall segment on an outside, an articulation piece is disposed, the first coupling element being joined to the articulation piece radially outside on the articulation piece (160), distanced relative to the pivoting axis.

9. The mixing device of claim 1, wherein the mixing device is employed in the turbofan engine having a fan, an aircraft gas turbine coupled to the fan, and wherein the mixing device, the aircraft gas turbine being configured and arranged to provide the first gas flow and the fan being configured and arranged to provide the second gas flow flowing radially outside relative to the first gas flow, the mixing device being disposed on a downstream side on the aircraft gas turbine and being configured and arranged to mix the first gas flow at least partially with the second gas flow.

* * * * *